United States Patent
Gonzalez et al.

(10) Patent No.: US 7,413,669 B2
(45) Date of Patent: Aug. 19, 2008

(54) SEPARATOR FOR LIQUIDS AND/OR MULTIPHASE FLUIDS

(75) Inventors: Jose Rafael Gonzalez, Los Teques (VE); Jorge Ramirez, San Andres (VE)

(73) Assignee: Intevep, S.A., Caracas (VE)

( * ) Notice: Subject to any disclaimer, the term of this patent is extended or adjusted under 35 U.S.C. 154(b) by 531 days.

(21) Appl. No.: 11/059,810

(22) Filed: Feb. 15, 2005

(65) Prior Publication Data
US 2005/0218088 A1   Oct. 6, 2005

Related U.S. Application Data

(60) Provisional application No. 60/559,785, filed on Apr. 6, 2004.

(51) Int. Cl.
*B01D 21/26* (2006.01)
*B01D 17/038* (2006.01)

(52) U.S. Cl. .............. 210/788; 210/512.1; 209/715; 209/719; 209/720; 209/725; 209/727; 209/733; 209/734; 55/459.1; 55/459.4

(58) Field of Classification Search ............ 210/512.1, 210/788; 209/715, 719, 720, 725, 727, 733, 209/734; 55/459.1, 459.4
See application file for complete search history.

(56) References Cited

U.S. PATENT DOCUMENTS
6,540,918 B2 * 4/2003 Gil et al. ............ 210/512.1

* cited by examiner

*Primary Examiner*—David A Reifsnyder
(74) *Attorney, Agent, or Firm*—Bachman & LaPointe, P.C.

(57) ABSTRACT

A separator including a conical member having a base; a substantially cylindrical member extending from the base; a separator inlet for introducing liquid to be separated into the conical member in a substantially tangential direction with respect to a sidewall of the conical member; a heavy phase outlet communicated with an apex portion of the conical member; and a light phase outlet communicated with the cylindrical member.

14 Claims, 3 Drawing Sheets

SEPARATOR FOR LIQUIDS AND/OR MULTIPHASE FLUIDS

CROSS-REFERENCE TO RELATED APPLICATION

This application claims the benefit of U.S. Provisional Application Ser. No. 60/559,785 filed Apr. 6, 2004.

BACKGROUND OF THE INVENTION

The invention relates to separation of fluids and, more particularly, to a separator which can advantageously separate liquids of different density as well as gases and/or solids from liquids.

Separation of different phases of a multi-phase flow is a frequently encountered problem in various industries including but not limited to the production of hydrocarbons. In the production of hydrocarbons, phases are frequently generated which contain different fractions of liquid of different densities as well as gas phases, solid phases or both. The rapid and efficient separation of these phases can be critical for processing of the flow into various different products of increased value, and also to generate different phases which can be treated in subsequent processes.

Numerous attempts have been made to provide suitable separation mechanisms. Despite the foregoing, the need remains for a simple, efficient and effective device and method for accomplishing this separation.

It is therefore the primary object of the present invention to provide such a system and method.

A further object of the present invention is to provide such a system and method which has simple construction and few or no parts subject to excessive wear whereby the system is easily maintained.

A further object of the present invention is to provide such a system and method which occupies little space as compared to other systems, and which can readily be incorporated into existing fluid handling equipment.

Other objects and advantages of the present invention will appear herein below.

SUMMARY OF THE INVENTION

In accordance with the present invention, the foregoing objects and advantages have been readily attained. According to the invention, a separator is provided which comprises a conical member having a base; a substantially cylindrical member extending from said base; a separator inlet for introducing liquid to be separated into the conical member in a substantially tangential direction with respect to the conical member; a heavy phase outlet communicated with an apex portion of the conical member; and a light phase outlet communicated with the cylindrical member.

In further accordance with the invention, a method is provided for separating components of a multi-phase fluid, which method comprises the steps of providing a separator comprising a conical member having a base; a substantially cylindrical member extending from said base; a separator inlet for introducing liquid to be separated into the conical member in a substantially tangential direction with respect to the conical member; a heavy phase outlet communicated with an apex portion of the conical member; and a light phase outlet communicated with the cylindrical member; introducing fluid into the inlet whereby the fluid rotates along an inner surface of the conical member and separates to a heavy phase flowing toward the heavy phase outlet and a light phase flowing to the cylindrical member and toward the light phase outlet.

BRIEF DESCRIPTION OF THE DRAWINGS

A detailed description of preferred embodiments of the present invention follows, with reference to the attached drawings, wherein.

DETAILED DESCRIPTION

The invention relates to a separator, and more particularly to a separator using both a conical and a cylindrical flow section to advantageously allow for rapid and efficient separation of fluids of different density including liquid, gas and even solid components.

Figure 1:
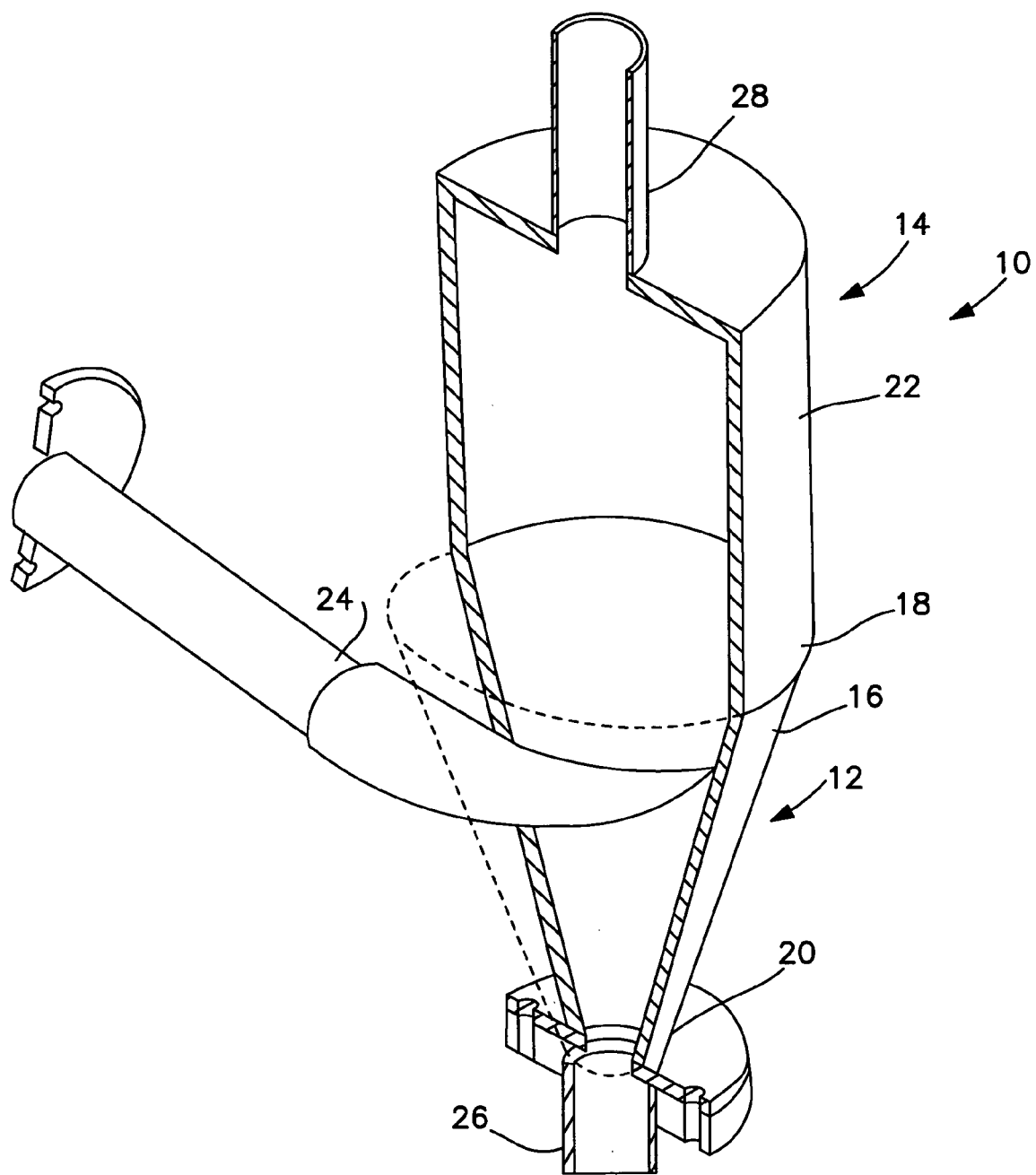
FIG. 1 is a partially sectioned perspective view of an apparatus in accordance with the present invention.

FIG. 1 illustrates a separator 10 in accordance with the present invention. Separator 10 according to the invention includes a substantially conical member or portion 12 and a substantially cylindrical member or portion 14.

Substantially conical member 12 is defined by a sidewall 16 and has a base 18 and an apex 20. As gravity along with flow serve to assist in separation of the desired materials, separator 10 is preferably arranged so that conical member 12 is substantially vertical with base 18 above apex 20.

Substantially cylindrical member 14 advantageously extends from base 18 and has a sidewall 22 defining the substantially cylindrical structure as desired.

An inlet 24 is provided for introducing fluid to be separated through sidewall 16 of conical member 12. As is further illustrated and described below, inlet 24 is advantageously positioned along conical member 12 to introduce flow substantially tangential to an inside surface of sidewall 16 so that flow smoothly transitions into a helical flow within separator 10.

Two outlets 26, 28 are also provided. Outlet 26 is a heavy phase outlet, and is advantageously communicated with apex 20. Outlet 28 is a light phase outlet and is communicated with cylindrical member 14, preferably toward an upper end of same as shown in FIG. 1.

In operation, fluid is introduced thorough inlet 24 and due to the configuration of the inlet and the shape of conical member 12, flows in a helical pattern and fills both conical member 12 and cylindrical member 14. At this stage difference in density between the liquids, gas and even solids leads to separation of phases due to both gravity and centripetal forces. Heavier components fall within separator 10 and thereby flow toward outlet 26, while lighter components such as lower density liquids and gases flow upwardly through cylindrical member 14 to outlet 28.

This structure can be utilized to separate liquids of different density and, also, can advantageously be utilized to separate liquid from gas, solid from liquid and combinations of the above.

The simplicity of the structure and lack of moving parts makes for a structure which is reliable, easy to maintain, and cost effective in manufacture, use and the like. Further, the structure of the present invention advantageously provides for separation utilizing a relatively small amount of space so that the apparatus of the present invention can be incorporated into existing pipeline and fluid handling plants while utilizing a minimum amount of space.

Figure 2:
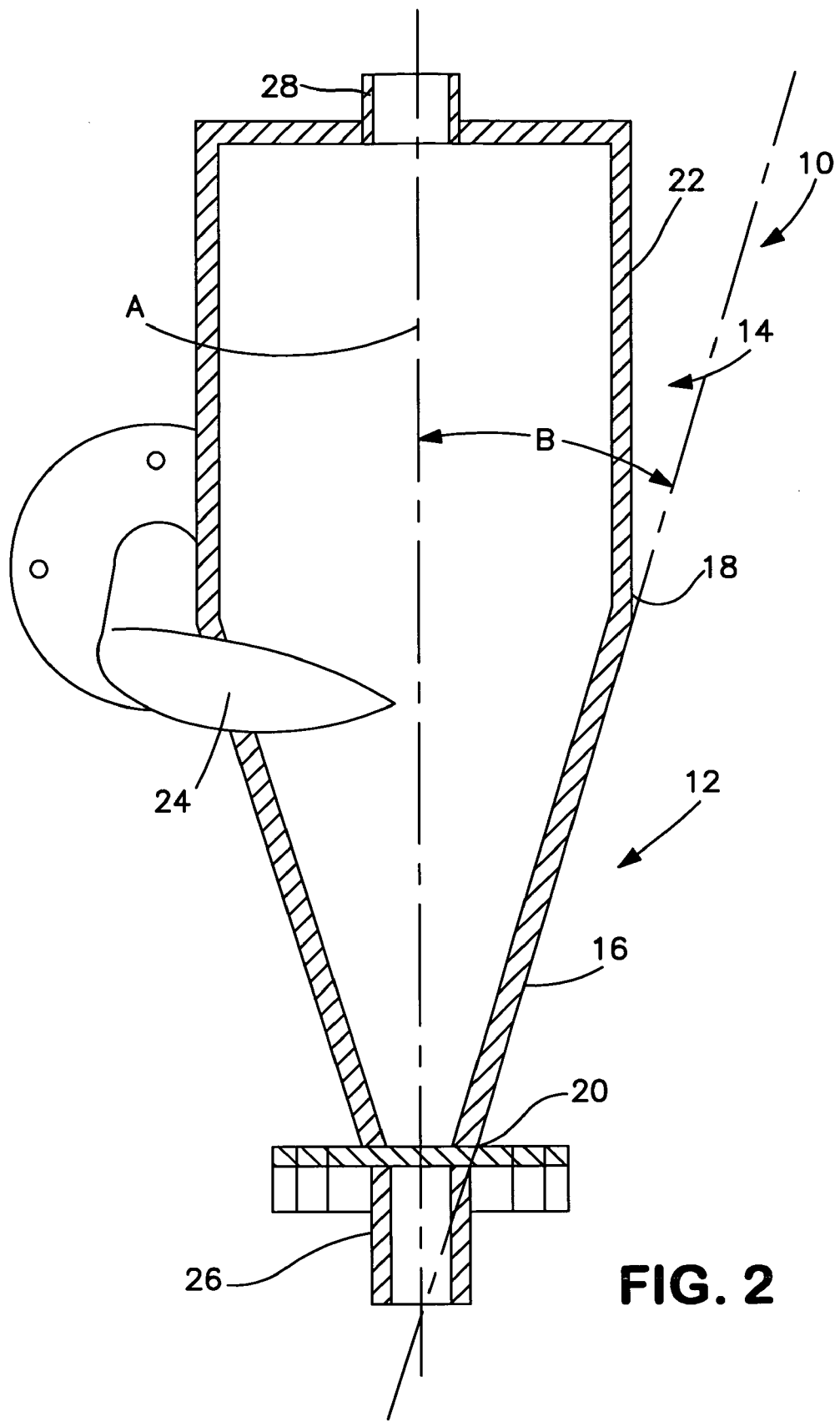
FIG. 2 is a side, partially sectioned view of an apparatus in accordance with the present invention.

Turning to FIG. 2, a cross-section is provided which illustrates further the structure of conical member 12. As shown, conical member 12 defined by sidewall 16 has a substantially central or longitudinal axis A. Further cylindrical sidewall 16 is advantageously oriented at an angle B to axis A, and this angle B is advantageously between about 15° and about 40°, preferably about between about 25° and about 30°. The angle of this sidewall can be tailored to specific phases to be separated. In an embodiment wherein the phases are hydrocarbons of different densities and/or water, it has been found particularly advantageous to utilize an angle B between sidewall 16 and axis A of about 27°.

FIG. 2 further illustrates that cylindrical member 14 extends substantially from the edge of conical member 12 which edges defines the base 18 of conical member 12. This is preferably a smooth transition from conical to cylindrical shape so as to avoid any irregularities in flow.

Figure 3:
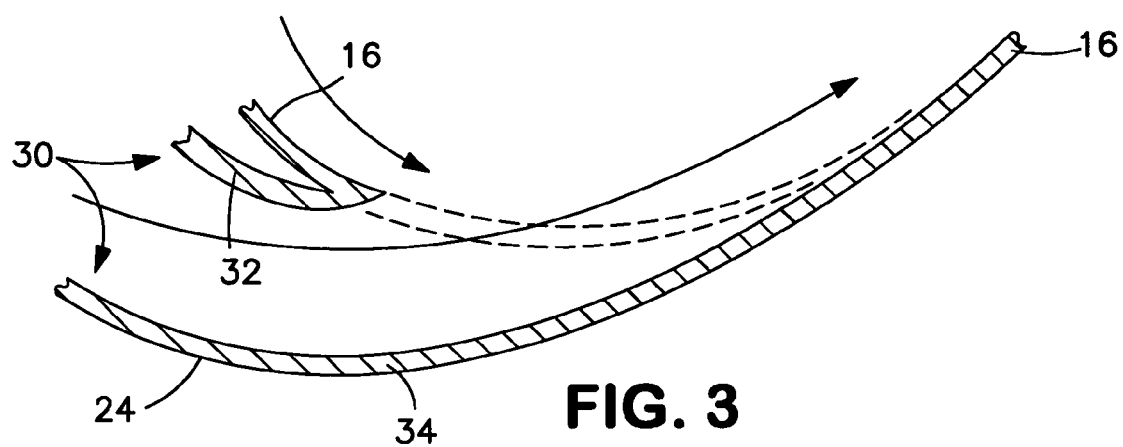
FIG. 3 illustrates the structure of an inlet of a separator in accordance with the present invention.

Turning to FIG. 3, a section is taken through inlet 24 to further illustrate the structure of same. As shown, inlet 24 is advantageously defined by inlet walls 30, and inlet walls 30 include a radially inner wall 32 and a radially outer wall 34. According to the invention, radially outer wall 34 is positioned so as to be substantially tangential with side wall 16 of conical member 12 so that flow through inlet wall 24 can enter smoothly into separator 10, rotating peripherally onto the inner surface of sidewall 16 and, from there, to occupy substantially the entire volume of both the cone and cylindrical members. This leads to segregation or separation of the fluid based upon the differences in density, and heavy phases can easily be removed from the lower outlet 26, while lightest phases are removed from separator 10 through the upper and/or lateral outlets such as outlet 28.

Positioning of inlet 24 in conical member 12 advantageously serves to impart both helical and upward and downward flow to the fluid depending upon respective densities therein. Further, positioning inlet 24 between base 18 and apex 20, so that a portion of sidewall 16 extends both upwardly and downwardly from inlet 24, advantageously further serves to define excellent separation of the fluid in question.

Separator 10 as well as the various inlets and outlets can be provided of any material suitable for use with the fluids to be separated. Specific materials would be well known to a person of ordinary skill in the art.

It should be appreciated that, as illustrated in the figures, it is preferable to have both cylindrical member 14 and conical member 12 positioned substantially coaxially, that is, around axis A. This also leads to smooth flow which assists in the desired separation.

Further, the helical and vertical nature of separator 10 and flow therein result in a very small "footprint" or amount of space occupied by same.

It should also be appreciated that the separator in accordance with the present invention can readily be incorporated into any existing fluid handling system. Specifically, inlet 24 can be communicated with any source of fluid to be separated and will thereby generate separated streams of heavy and light materials as desired.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A separator comprising:
   a conical member having a base;
   a substantially cylindrical member extending from said base;
   a separator inlet for introducing liquid to be separated directly into the conical member in a substantially tangential direction with respect to a sidewall of the conical member;
   a heavy phase outlet communicated with an apex portion of the conical member; and
   a light phase outlet communicated with the cylindrical member.

2. The separator of claim 1, wherein the conical member is positioned with the base above the apex, and wherein the cylindrical member extends from the base.

3. The separator of claim 2, wherein the conical member and the cylindrical member are positioned substantially coaxially along a substantially vertical axis.

4. The separator of claim 1, wherein the conical member is defined by the sidewall and has an axis and wherein the sidewall is arranged at an angle relative to the axis of between about 15° and about 40°.

5. The separator of claim 4, wherein the angle is between about 25° and about 30°.

6. The separator of claim 1, wherein the inlet is positioned between the apex and the base of the conical member.

7. The separator of claim 1, wherein the conical member is defined by a sidewall and wherein the inlet passes through the sidewall and defines a flow path which is substantially tangential to the sidewall.

8. A method for separating phases of a fluid, comprising the steps of:
   providing a separator comprising a conical member having a base; a substantially cylindrical member extending from said base; a separator inlet for introducing liquid to be separated directly into the conical member in a substantially tangential direction with respect to a sidewall of the conical member; a heavy phase outlet communicated with an apex portion of the conical member; and a light phase outlet communicated with the cylindrical member; and
   introducing fluid into the inlet whereby the fluid rotates along an inner surface of the conical member and separates to a heavy phase flowing toward the heavy phase outlet and a light phase flowing to the cylindrical member and toward the light phase outlet.

9. The method of claim 8, wherein the conical member is positioned with the base above the apex, and wherein the cylindrical member extends from the base.

10. The method of claim 9, wherein the conical member and the cylindrical member are positioned substantially coaxially along a substantially vertical axis.

11. The method of claim 8, wherein the conical member is defined by a sidewall and has an axis and wherein the sidewall is arranged at an angle relative to the axis of between about 15° and about 40°.

12. The method of claim 11, the separator of claim 4, wherein the angle is between about 25° and about 30°.

13. The method of claim 8, wherein the inlet is positioned between the apex and the base of the conical member.

14. The method of claim 8, wherein the conical member is defined by a sidewall and wherein the inlet passes through the sidewall and defines a flow path which is substantially tangential to the sidewall.

* * * * *